Feb. 10, 1970 L. F. URRY 3,494,801

DRY CELL WITH NOVEL VENTING MEANS

Filed Feb. 16, 1968

INVENTOR
LEWIS F. URRY
BY
ATTORNEY

United States Patent Office 3,494,801
Patented Feb. 10, 1970

3,494,801
DRY CELL WITH NOVEL VENTING MEANS
Lewis F. Urry, North Olmsted, Ohio, assignor to Union Carbide Corporation, a corporation of New York
Filed Feb. 16, 1968, Ser. No. 706,028
Int. Cl. H01m 1/06
U.S. Cl. 136—178           4 Claims

ABSTRACT OF THE DISCLOSURE

A dry cell employing a cylindrical cupped container having an open end sealed by a closure disc is provided with a novel valve vent comprising a flat annular seal gasket overlying a venting aperture formed within the disc and which is biased into normally sealing relation around the aperture by one leg of an L-shaped seal ring mounted over the peripheral edges of the container. Upon the development of a predetermined gas pressure within the cell, the leg of the seal ring is deflectable in a direction away from the flat annular seal gasket momentarily breaking the seal around the venting aperture and allowing gas to escape from inside the cell.

---

This invention relates to dry cells and especially dry cells employing a magnesium anode, and more specifically concerns the provision of novel venting means for releasing gas pressure developed during discharge of such cells.

Magnesium dry cells are ideally suited for use as the power source in many applications where a high working voltage is required. As compared to the conventional Leclanché dry cell with a zinc anode, magnesium cells operate at a voltage of about 0.3 volt higher under conditions of equivalent current drain. Despite this rather significant advantage, magnesium cells have not yet attained widespread use primarily because they have been plagued by many difficulties.

One of the most serious difficulties encountered with magnesium cells is that of gas generation and possible build-up of dangerous gas pressure during discharge of the cells. This is due to the rather poor efficiency of the active magnesium anode which reacts wastefully with water in the electrolyte to produce hydrogen gas in copious quantities.

In the past, Leclanché dry cells have employed venting means for releasing gas pressure developed within the cell. Usually this venting means has consisted of an open diffusion vent of one type or another formed within the cell closure. While this type of venting means may be satisfactory for a Leclanché dry cell, it is by no means suitable for use in a magnesium cell since an open diffusion vent is not capable of rapidly releasing large quantities of gas from inside the cell. A magnesium cell generally will produce gas on normal discharge at a rate of up to one thousand times faster than a Leclanché dry cell which does not generate gas in serious quantities until the cell has been completely discharged.

Another disadvantage of an open diffusion type vent as used in prior Leclanché dry cells is that it too readily permits the continued loss of moisture from the cell. For extended shelf life, a magnesium cell must be capable of retaining substantially all of its initial water content and consequently the cell is required to be hermetically sealed during the period of shelf storage.

Still another disadvantage of such prior diffusion type vents is that they are open at all times during discharge as well as when the cell is on shelf. Ideally, venting means for a magnesium cell should be capable of maintaining the cell in a sealed condition during shelf storage and then rapidly releasing copious quantities of gas generated when the cell is discharged. In addition, the venting means should be capable of resealing itself once the gas pressure has been released. Moreover, the venting means used must be simple in construction and inexpensive to manufacture.

It is therefore an important object of this invention to provide a novel and improved venting means for a dry cell.

A more specific object of this invention is to provide a novel and improved venting means for a magnesium cell which will maintain the cell in a sealed condition during the time that the cell is on shelf storage but which is capable of rapidly releasing gas pressure from inside the cell when copious quantities of gas are generated.

Another object of this invention is to provide such a novel and improved venting means which is capable of resealing itself once the gas pressure has been released.

Still another object of this invention is to provide such a novel and improved venting means which is simple in construction, inexpensive to manufacture and which is constructed from parts forming the sealed closure of the cell.

The foregoing and other objects are accomplished in accordance with the invention by the provision in a dry cell employing a cylindrical cupped container having an open end sealed by a closure disc of a valve vent comprising a flat annular seal gasket overlying a venting aperture formed within the disc and which is biased into normally sealing relation around the aperture by one leg of an L-shaped seal ring mounted over the peripheral edges of the container. Upon the development of a predetermined gas pressure within the cell, the leg of the seal ring is deflectable in a direction away from the flat annular seal gasket momentarily breaking the seal around the venting aperture and allowing the gas to escape from inside the cell.

Reference will now be made in the ensuing specification to the accompanying drawing which shows specific embodiments of the invention, and wherein.

Figure 2:
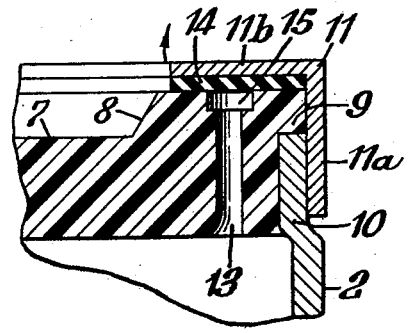
FIGURE 2 is an enlarged sectional view of a portion of the dry cell of FIGURE 1 showing the several parts of the novel valve vent in greater detail.
Figure 3:
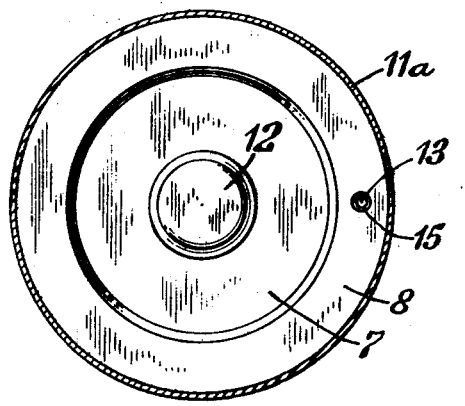
FIGURE 3 is a plan view taken along line 3—3 in FIGURE 1.
Figure 1:
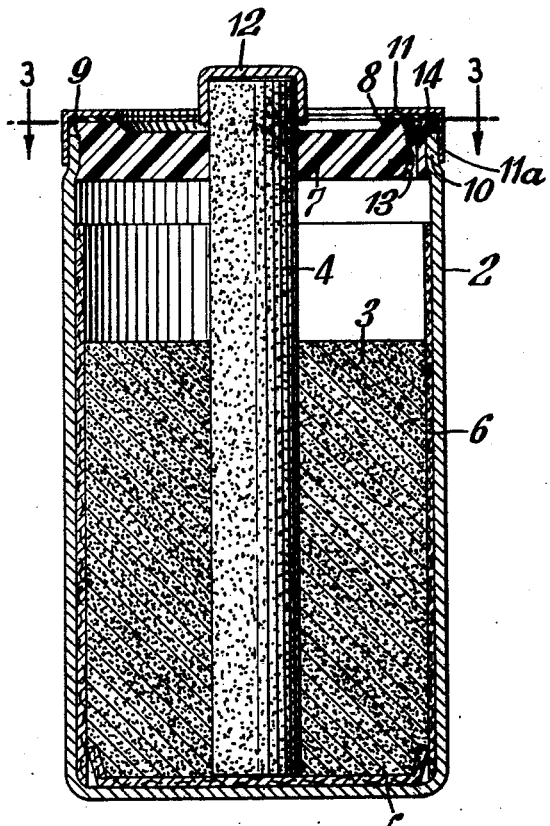
FIGURE 1 is an elevational view in section of a dry cell embodying the novel valve vent of the invention.

Referring to FIGURES 1–3, there is shown a dry cell embodying the invention. As denoted by the reference numeral 2, the cell includes a cylindrical cupped container of a consumable magnesium metal or alloy which serves as the anode of the cell. Within this container-anode 2 there is disposed the usual cathode bobbin consisting of a manganese dioxide depolarizer mixture 3 and a carbon cathode rod 4. The cathode rod 4 is embedded within the depolarizer mixture 3 and extends at its top end beyond the upper peripheral edges of the container-anode 2. A star washer 5 is placed at the bottom of the cathode bobbin and insulates the depolarizer mixture 3 and the cathode rod 4 from the bottom end of the container anode 2. An ion permeable separator in the form of a bibulous paper sleeve 6 surrounds the cathode bobbin between the depolarizer mixture 3 and the side walls of the container-anode 2. The separator may consist of a methyl cellulose coated paper, for example.

The closure for the cell is provided in the form of an insulating annular disc 7 suitably of a plastic material, which is tightly fitted around the upper end portion of the cathode rod 4 within the open end of the container-anode 2. The insulating disc 7 is provided with an annular raised peripheral edge portion 8 on its top surface which forms a shoulder 9 resting on the upper peripheral edges of the container-anode 2. Just beneath the shoulder 9 the upper peripheral edges of the container-anode 2 are formed or bent inwardly as at 10 to accommodate one leg 11a of a seal ring 11 suitably made of steel. The leg 11a is compressed or forced inwardly under a high radial pressure against the exterior side wall of the container-anode 2 to form a tight radial seal between the abutting outer edges of the insulating disc 7 and the interior side wall of the container-anode 2. A metal terminal cap 12 is fitted over the top of the carbon rod 4 and serves as one terminal of the cell.

FIGURE 2 shows in enlarged detail the valve vent which is formed by the provision of a venting aperture 13 within the peripheral edge portion 8 on the insulating disc 7. Overlying the venting aperture 13 is a flat annular seal gasket 14. The flat annular seal gasket 14 may be made from any suitable gasket material such as rubber or neoprene or the like and preferably is of a size so as to cover the whole top surface of the peripheral edge portion 8 on the disc 7. The leg 11b of the seal ring 11 extends radially inwardly from the peripheral edge of the container-anode 2 and is mounted in resilient pressure contact aganist the top surface of the flat annular seal gasket 14. It will be seen that the leg 11b constitutes in effect a gasket retaining member which biases the flat annular seal gasket 14 into normally sealing relation around the venting aperture 13 but which at the same time is deflectable in a direction away from the flat annular seal gasket 14 as generally indicated by the arrow in the drawing. Such deflection of the leg 11b may occur about a fixed or pivotal end which is located at the point where it joins the other leg 11a of the seal ring 11.

During the time that the cell is on shelf storage or on initial discharge when little if any gas is generated, the vent valve is maintained in a normally closed position and there is substantially little if any loss of moisture from inside the cell. However, when the cell is discharged, there may be generated copious quantities of gas which can give rise to the build-up of an excessive or unsafe internal gas pressure inside the cell. When this predetermined gas pressure is reached, the leg 11b of the seal ring 11 is caused to deflect in a direction away from the flat annular seal gasket 14 momentarily breaking the seal around the venting aperture 13 and allowing gas to escape from the cell. Once the gas pressure has been released, the leg 11b returns to its initial biasing position over the top of the flat annular seal gasket 14, thus resealing the valve vent.

In operation of the valve vent, the leg 11b of the seal ring 11 is caused to deflect upon the build-up of internal gas pressure inside the cell by the force of this pressure applied through the venting aperture 13 against the underneath side of the flat annular seal gasket 14. At the same time, the internal gas pressure is also applied directly against the bottom of the insulating disc 7. This forces the disc 7 outwardly through the open end of the container-anode 2 which in turn causes the leg 11b to deflect in a direction away from the top of the flat annular seal gasket 14. Thus it will be seen that deflection of the leg 11b of the seal ring 11 to open the valve vent is the result of the internal gas pressure applied against the effective area of gas contact on both the flat annular seal gasket 14 and the bottom of the insulating disc 7.

Since the lateral area of the insulating disc 7 is larger than the area of gas contact on the flat annular seal gasket 14, the force exerted by the internal gas pressure on the bottom of the insulating disc 7 has a greater effect upon deflection of the leg 11b and thus the opening of the valve vent. This is advantageous since a relatively small venting aperture 13 may be used. A small aperture is desired to enhance the moisture retention capability of the vent, i.e., large apertures tend to allow more moisture to escape from the cell.

However, if a proper balance of pressure ratio, i.e., pressure on the insulating disc 7 versus pressure on the flat annular seal gasket 14, is not maintained there is the danger that the insulating disc 7 might be forced out from the cell. This balance of pressure ratio can be achieved by increasing the area of gas contact on the underneath side of the flat annular seal gasket 14. One obvious way to do this is to increase the size of the venting aperture 13 but this is undesirable both from the standpoint of moisture loss and available space. Another approach is to increase the number of venting apertures, say three apertures spaced 120° apart, but this is also undesirable since the increased number of apertures tends to weaken the insulating disc 7.

In the valve vent illustrated in FIGURES 1–3, the venting aperture 13 is formed with an enlarged circular opening or recess 15 on the top surface of the insulating disc 7. This opening or recess 15 has the effect of enlarging the area of gas contact on the underneath side of the flat annular seal gasket 14. With this enlarged area of gas contact, a proper balance of pressure ratio may be easily attained without increasing the size or number of venting apertures.

Figure 4:
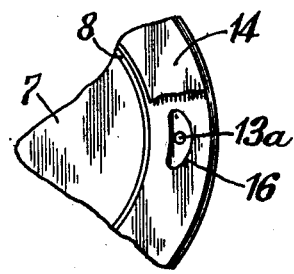
FIGURE 4 is a fragmentary view of a portion of the cell in FIGURE 3 showing a modification of the invention.

FIGURE 4 shows a modification of the valve vent wherein the venting aperture 13a is formed with a somewhat elliptical or kidney shaped opening or recess 16. By positioning the elliptical or kidney shaped opening or recess 16 along a circumferential line normal to the radial axis of the insulating disc 7, it will be seen that an even larger area of gas contact can be attained without increasing the dimensions or size of the leg 11b or the flat annular seal gasket 14.

Figure 5:
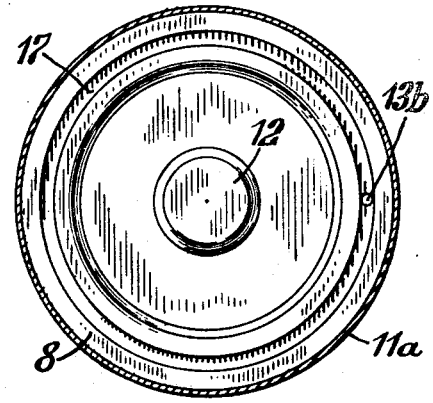
FIGURE 5 is a plan view similar to FIGURE 3 showing another modification of the invention.

Still another modification is shown in FIGURE 5. Here, the valve vent is formed with a venting aperture 13b which communicates with an annular or circumferential groove 17 provided on the top surface of the peripheral edge portion 8 on the insulating disc 7. The annular or circumferential groove 17 provides for a greatly enlarged area of gas contact on the underneath side of the flat annular seal gasket 14 for effecting gas release at low pressures.

It will be noted that in all of the dry cell constructions described, the annular raised peripheral edge portion 8 serves to add strength to that part of the insulating disc 7 in which the venting aperture 13 is formed. While the peripheral edge portion 8 may be eliminated if desired, it is recommended for use on smaller size cells such as A size cells.

In one series of tests, a number of A size magnesium cells were constructed using a valve vent formed with a 0.025 inch venting aperture having a 1/16 inch diameter recess at the top. The cells were stored on shelf for a period of about one month at 160° F. and were found to have lost less than 5% of their original water content. On discharge the cells were also found to release gas at acceptable rates of up to 80 cc./min.

What is claimed is:
1. In a dry cell, the combination of:
 (a) a cylindrical cupped container having an open end;
 (b) a closure disc mounted within the open end of said container having its outer peripheral edges abutting against the interior side wall of said container, said closure disc having a venting aperture therein;
 (c) a flat annular seal gasket disposed on top of said closure disc and overlying said venting aperture; and
 (d) an L-shaped seal ring mounted over the upper peripheral edges of said container and having one leg thereof disposed under a radially inwardly directed pressure against the exterior side wall of said container forcing said side wall inwardly against the abutting peripheral edges of said closure disc to effect a radial seal therebetween and the other leg of said seal ring being disposed inwardly over the top of said flat annular seal gasket biasing said seal gasket in a normally sealing relation around said aperture but being deflectable in a direction away from said seal gasket upon the development of a predetermined gas pressure within said container.

2. The dry cell as defined by claim 1 wherein the venting aperture is formed with an enlarged circular recess at the top surface of said closure disc.

3. The dry cell as defined by claim 1 wherein the venting aperture is formed with an enlarged elliptical shaped recess at the top surface of said closure disc.

4. The dry cell as defined by claim 1 wherein a circumferential groove is formed within the top surface of said closure disc communicating with said venting aperture.

References Cited

UNITED STATES PATENTS

| | | |
|---|---|---|
| 2,060,799 | 11/1936 | Drummond. |
| 2,322,210 | 6/1943 | Adams _____ 136—100 |
| 2,879,315 | 3/1959 | Gelardin _____ 136—177 XR |
| 3,427,202 | 2/1969 | Wilke _____ 136—133 XR |

ALLEN B. CURTIS, Primary Examiner

D. L. WALTON, Assistant Examiner

U.S. Cl. X.R.

136—133